United States Patent [19]

Takeda et al.

[11] Patent Number: 5,895,446
[45] Date of Patent: Apr. 20, 1999

[54] PATTERN-BASED TRANSLATION METHOD AND SYSTEM

[75] Inventors: Koichi Takeda; Hideo Watanabe; Shiho Ogino, all of Machida, Japan

[73] Assignee: International Business Machines Corporation, Armonk, N.Y.

[21] Appl. No.: 08/879,480

[22] Filed: Jun. 20, 1997

[30] Foreign Application Priority Data

Jun. 21, 1996 [JP] Japan .................................. 8-161799

[51] Int. Cl.⁶ .................................................. G06F 17/28
[52] U.S. Cl. ................................. 704/2; 704/5; 704/4
[58] Field of Search ........................................ 704/1–8

[56] References Cited

U.S. PATENT DOCUMENTS

| | | | |
|---|---|---|---|
| 4,502,128 | 2/1985 | Okajima et al. | 704/2 |
| 4,775,956 | 10/1988 | Kaji et al. | 704/2 |
| 5,267,156 | 11/1993 | Nomiyama et al. | 704/2 |
| 5,357,430 | 10/1994 | Rackow et al. | 704/8 |
| 5,442,547 | 8/1995 | Kutsumi et al. | 704/8 |
| 5,477,450 | 12/1995 | Takeda et al. | 704/2 |
| 5,640,575 | 6/1997 | Maruyama et al. | 704/2 |

*Primary Examiner*—David R. Hudspeth
*Assistant Examiner*—Patrick N. Edouard
*Attorney, Agent, or Firm*—Edward H. Duffield; Andrew J. Dillon

[57] ABSTRACT

The present invention provides a method for associating a part of a source language text with a translation pattern to translate that part into a target language. Translation patterns are provided, each of which comprises a source language pattern, a target language pattern corresponding to the source language pattern, a variable corresponding to the source language pattern, and a variable corresponding to the target language pattern. If a part of the source language text matches a source language pattern, that source language pattern is represented with a first variable and the corresponding target language pattern is represented by a second variable. If the part of the source language text which is represented with the first variable matches another source language pattern with a nested structure in which at least the first variable is included, that source language pattern is represented with a third variable and the target language pattern which corresponds to that source language pattern and has a nested structure in which the second variable is included is represented by a fourth variable. A translation can be provided by applying all the corresponding parts of the target language text to such a translation pattern.

19 Claims, 9 Drawing Sheets

| Source language pattern | Variable | Variable | Target language pattern |
|---|---|---|---|
| | $S | $S | $VP:2 $NP:1 |
| | $S | $S | Improve $NP:1 in productivity |
| | $N:1 | $NP:1 | Improvement |
| | $V:1 | $NP:1 | Improve in productivity |
| | $N:1; +DEVICE | $NP:1 | point of contact |
| | $N:1; +ACTION | $NP:1 | connection |

| Source language pattern | Variable | Target language pattern |
|---|---|---|
| copy~to~ | # | COPYFILE $1 $2 |
| delete~ | # | DEL $1 |
| insert~to~ | # | APPEND $1 $2 |
| @.% | ~ | $1.$2 |
| text | % | txt |
| data | % | dat |

| Source language pattern | Variable | Target language pattern |
|---|---|---|
| ～は ～である | ~ | $1 is $2 |
| ～を ～する | ~ | $2$1 |
| ～を 改良する | ~ | Improve $1 in productivity |
| %は ～である | ~ | $1 are $2 |
| ---------- | | ---------- |
| 特許 | ~ | patent |
| 特許出願 | ~ | patent application |
| 特許出願する | ~ | file for patent application |
| 特許請求の範囲 | ~ | claim |
| 特許請求の範囲#項 | ~ | claim $1 |
| 特許請求の範囲#項及び#項 | % | claims $1 and $2 |
| ---------- | | ---------- |

*Fig. 11*

*Prior Art*

PATTERN-BASED TRANSLATION METHOD AND SYSTEM

BACKGROUND OF THE INVENTION

1. Technical Field

The present invention relates to a translation method and translation system based on patterns, and particularly to a translation system which is based on translation patterns.

2. Description of the Related Art

As the Internet comes into widespread use, more and more documents written in foreign languages are being accessed. As a tool to translate such documents into a native language, machine translation systems are rapidly becoming widespread. However, in an environment such as the Internet, where information in a wide variety of fields is available for access, a single word may have a quite different meaning and even be translated differently depending on the fields. Therefore, customizing a translation system according to a field is important for the users and developers of a translation system.

One such method of customization involves adding words to or changing words in a dictionary, or modifying grammatical rules used for the system. Such customization requires expertise and in addition, is likely to increase ambiguities due to the inconsistency of terms or grammatical rules. Therefore, improvement of translation accuracy or proper selection of terms according to fields is not always possible.

Thus, in recent years a machine translation system using translation patterns has come to attention and has been commercialized. In this system, a large number of translation patterns for each word, clause, phrase, or sentence in a source language corresponding to those in a target language are provided in advance. A part of a text (a sentence or word) written in the source language is matched against the translation patterns to take the text as a mosaic comprising a number of translation patterns. Then, the source language is translated into the target language based on those translation patterns. Although such a method requires a large number of translation patterns, it has the significant advantage that such a system can easily be customized because the user can define translation patterns easily.

Published Unexamined Patent Application No. 5-290082 discloses a translation apparatus which matches text written in a source language against a plurality of translation patterns provided in advance, then translates the text based on the results. FIG. 11 shows an example of translation patterns used in the prior art. As can be seen, a number of translation patterns are provided, each of which is comprised of a source language pattern, a variable representing that source language pattern with one character, and a target language pattern corresponding to that source language pattern. Some translation patterns are represented by a nested structure which contains a variable representing another translation pattern. However, with this prior art, the range of language patterns which can be matched by one translation pattern is very narrow, because only one variable is provided for each translation pattern. This would be a particularly serious problem in a case where the part of speech of the source language pattern differs from that of the target language pattern.

Source language pattern: "worry about"

Target language pattern: "shimpai da"

In the above example, the pattern of speech of the source language pattern is a verb, whereas the pattern of speech of the target language pattern is an adjective. In such a case, the target pattern cannot be represented by a single variable in prior art.

In addition, in the prior art a variable representing a source language pattern cannot have information which is held by that pattern. For example, although a noun in singular form and a noun in plural form in English are similar in representation, they cannot be distinguished by a single translation pattern, and different patterns must be used for the respective forms.

Due to the above-mentioned reasons, the number of representations which can be matched by one translation pattern are limited, so that a large number of translation patterns must be provided in order to generate accurate translations.

SUMMARY OF THE INVENTION

In view of the foregoing, it is therefore one object of the present invention to provide efficient language translation by using a translation pattern which can match an increased number of representations.

It is another object of the present invention to provide a translation system which can be easily customized by the user and allows an efficient retrieval of translation information.

A first embodiment of the present invention provides a method of translating a part of a text written in a source language into a target language by associating the part of the text with a translation pattern, wherein a plurality of translation patterns are provided in advance, each of which comprises a source language pattern, a target language pattern corresponding to the source language pattern, a variable corresponding to the source language pattern, and a variable corresponding to the target language pattern. If a part of the text matches a source language pattern in a translation pattern, the source language pattern is represented with a first variable and a target language pattern which corresponds to the source language pattern is represented with a second variable. Thus, if the part of the text which is represented with the first variable matches another source language pattern having a nested structure in which at least the first variable is included, that source language pattern is represented with a third variable. Then, a target language pattern corresponding to the source language pattern and having a nested structure in which the second variable is included is represented with a fourth variable.

A more proper translation can be yielded if the condition for representing patterns with the third and fourth variables, that is, "if the part of the text which is represented with the first variable matches another source language pattern having a nested structure in which at least the first variable is included", is stricter, that is, "if the part of the text which is represented with the first variable matches another source language pattern having a nested structure in which the first variable is included and the target language pattern corresponding to that source language pattern has a nested structure in which the second variable is included".

In such a configuration, the source language pattern and the target language pattern have identity information indicating the characteristics of the patterns, and the variables are given the identity information on the patterns to be represented. In particular, each variable has an index and is given identity information on the pattern through the index in the variables.

The contents of the pattern identity information often varies depending on languages. In Japanese, for example, a conjugated form of a verb is important. Thus, in many cases, information about a conjugated form of a verb is required as identity information. Such information is not required in English. Rather, the quantity of a noun is important in English, whereas, the quantity of a noun is not important in Japanese. Therefore, the substance of identity information held by a source language pattern in a translation pattern generally differs from the substance of identity information held by a target language pattern.

In addition, whether a part of a text represented with a first variable matches another source language pattern having a nested structure in which the variable is embedded is determined by taking account of the identity information given to the variable.

A second embodiment of the present invention provides a translation system for translating a text written in a source language into a target language, wherein a part of a text written in the source language is translated into the target language by associating the part of the text written in the source language with a translation pattern. That is, a number of translation patterns are provided, each of which comprises a source language pattern, a target language pattern corresponding to the source language pattern, a variable representing the source language pattern, and a variable representing the target language pattern, and those translation patterns are stored in a storage means. This system comprises a means for representing a source language pattern with a first variable and representing a target language pattern corresponding to that source language pattern with a second variable if a part of a text written in the source language matches a source language pattern; and a means for representing the source language pattern with a third variable and representing a target language pattern which corresponds the source language pattern and has a nested structure in which the second variable is included, with a fourth variable.

Here, the means for representing the patterns with the third and fourth variables preferably performs the representation if the part of the text which is represented with the first variable matches another source language pattern having a nested structure in which the first variable is included, and the target language pattern corresponding to the other source language pattern has a nested structure in which the second variable is included.

The method and system of the present invention may further allow a user to create translation patterns and add them to patterns stored in the translation system.

A third embodiment of the present invention provides a storage medium storing a program which translates a text written in a source language into a target language by associating a part of the text with a translation pattern to translate that part into the target language. That is, translation patterns are provided for this program, each of which comprises a source language pattern, a target language pattern corresponding to said source language pattern, a variable representing said source language pattern, and a variable representing said target language pattern. Furthermore, this program includes: instruction means for referencing the translation patterns, and, if a part of a text written in a source language matches one of the source language patterns, instruction means for representing that source language pattern with a first variable and representing a target language pattern which corresponds to the source language pattern with a second variable; and instruction means for, if the part of the text represented with the first variable matches another source language pattern having a nested structure in which at least the first variable is included, representing the source language pattern with a third variable and representing a target language pattern having a nested structure in which the second variable is included with a fourth variable.

Another embodiment of the present invention relates to a customization method in a system for translating a text written in a source language into a target language by associating a part of the text written in the source language with a translation pattern, said customization method includes a method for adding translation patterns to the system. The method comprises the steps of: creating a source language pattern; creating a target language pattern corresponding to the source language pattern, associating a variable including an index with the source language pattern; and associating another variable including an index with the target language pattern. Thus, one index provides identity information of the target language pattern to one variable. The other index provides identity information of the source language pattern to the other variable.

Operation

The invention described above extends the range of representations which can be matched by one translation pattern because a source language pattern and a target language pattern are represented with different variables. For example, a pattern "worry about" in a translation pattern and the corresponding pattern "shimpai da" differs in a part of speech (identity information). Therefore, the prior art, which provides only one variable for each translation pattern, cannot represent two patterns having different identity information. The present invention, in contrast, provides a pair of variables for each translation pattern, thus the characteristics of each language pattern can be provided with the variables as identity information. Because a variable reflects the identity information of the original pattern represented by that variable, a more accurate translation can be generated by combining the translation patterns.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates a part of a translation pattern which relates to a text;

FIG. 11 illustrates translation patterns used in prior art.

DETAILED DESCRIPTION OF AN
ILLUSTRATIVE EMBODIMENT

Figure 1:
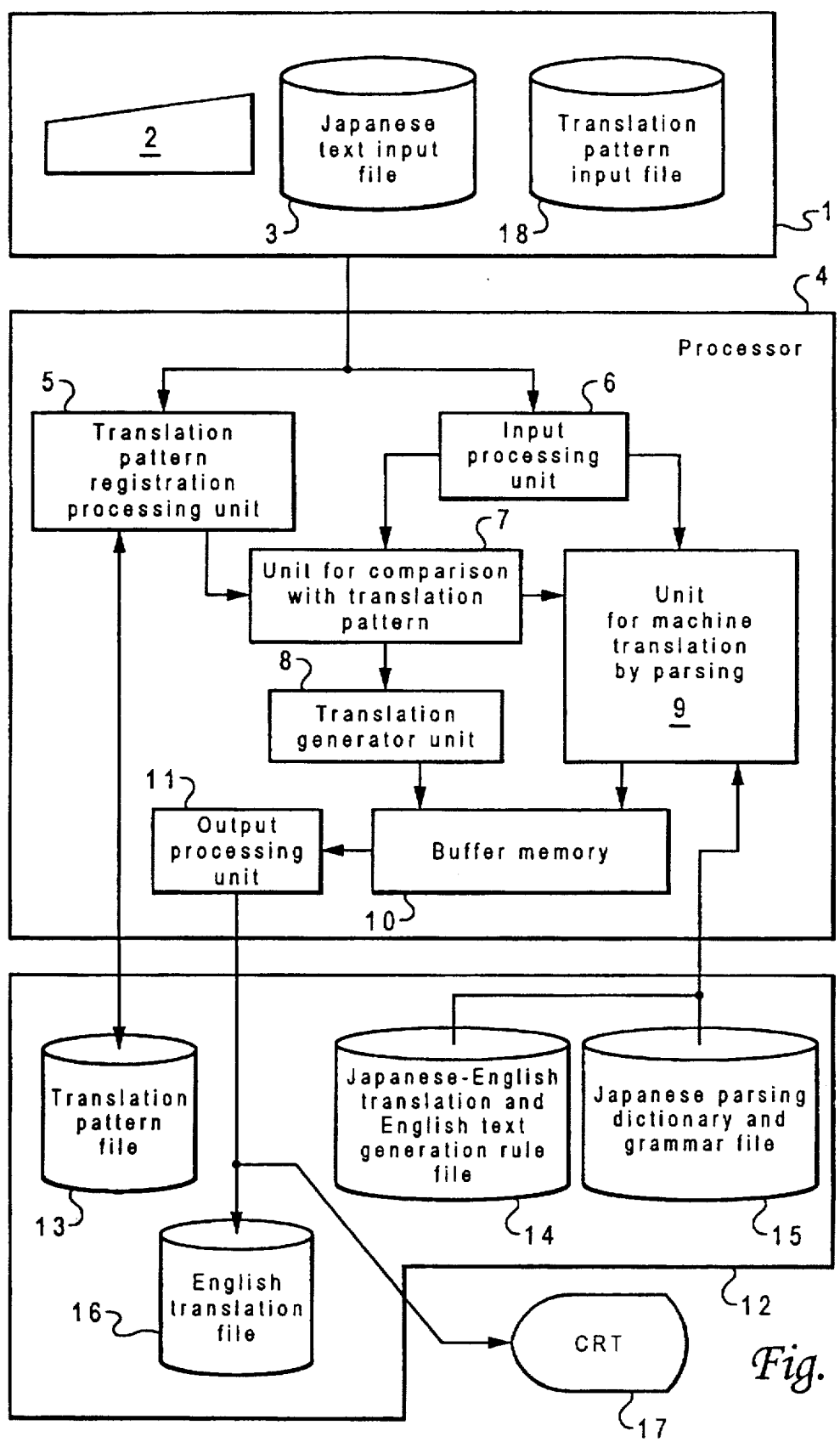
FIG. 1 is a block diagram illustrating a configuration of a machine translation system according to an embodiment of the present invention.

FIG. 1 is a block diagram showing a configuration of a machine translation system embodying the present invention. In the following description, translation from Japanese into English is used as an example.

An input means 1 is comprised of a keyboard 2, a Japanese text input file 3, and translation pattern input file 18. Text data and various operation commands are input from this input means 1 into a processor 4.

The processor 4 has a typical configuration including a processing unit, memory, and controller unit and performs translation processing according to processing steps described later. With respect to the function of this embodiment, the processor 4 comprises a translation pattern registration processing unit 5, an input processing unit 6, a comparator unit 7, a translation generator unit 8, a machine translator unit 9, buffer memory 10, and an output processing unit 11.

The translation pattern registration unit 5 is used by a user to generate a table of translation patterns and to register translation patterns. The input processing unit 6 sends a Japanese text input from the input means 1 to the comparator unit 7, where the text is compared with translation patterns in a translation pattern file 13 to determine whether there is a match. If there is a match, an English translation text is generated in the translation generator unit 8 by using that translation pattern and sent to the output processing unit 11 through buffer memory 10. If there is no match, translation processing is performed in the machine translator unit 9 through parsing the text. Alternatively, all Japanese texts may be translated by using both the translation-pattern-based process and the machine-translator-based process, then comparing the results to chose a better translation.

An external storage 12 includes a translation pattern file containing translation patterns, a Japanese-English translation and English text generation rule file 14 for machine translation, a Japanese parsing dictionary and grammar file 15, and an English translation file 16. The English translation file 16 is used to store English texts translated by the translation generator unit 8 and machine translator unit 9. The progress and results of the translation are displayed on a display means 17.

Figure 2:
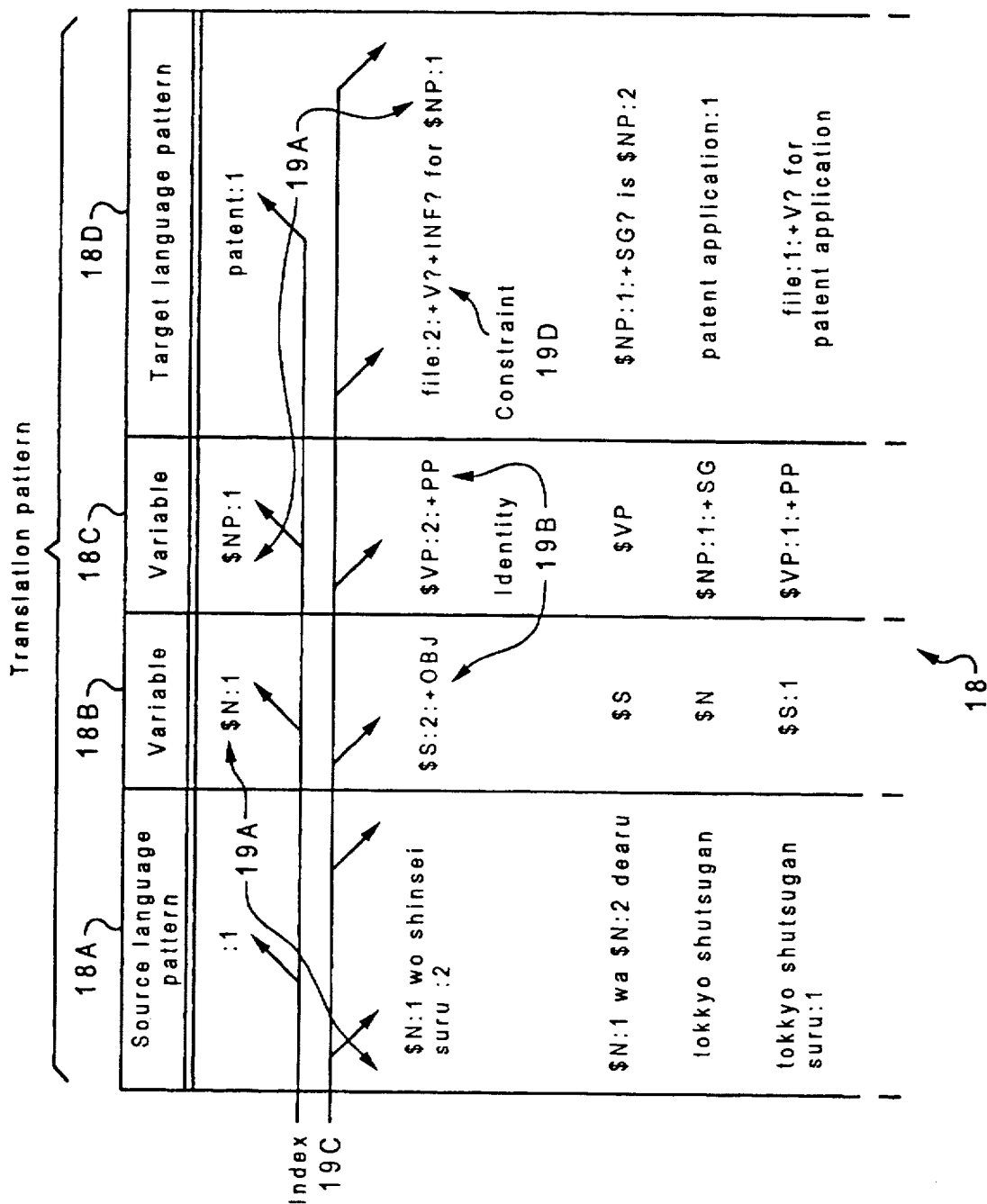
FIG. 2 illustrates an example of translation patterns according to the present invention.

FIG. 2 is a table showing internal representations of translation patterns. A translation pattern 18 is comprised of the following 4-tuple as a unit:

<source language pattern, variable for source language pattern, variable for target language pattern, target language pattern>

A feature of this structure is that one translation pattern includes two variables: one variable representing a source language pattern and one variable representing a target language pattern.

For example, suppose a given translation pattern is represented by a 4-tuple <tokkyo:1, $N:1, $NP:1, patent:1>. This translation pattern indicates that the source language pattern, the character string "tokkyo", is translated to the target pattern, the character string "patent". At the same time, the pattern "tokkyo" is represented with the variable $N and the pattern "patent" is represented with the variable $NP.

The source language pattern and the target language pattern have identity information indicating characteristics of those patterns. Specific parameters for identity information include the following information.

Identity information for Japanese pattern
  Part of speech
  Conjugation
  Identity of noun (such as proper noun)
  Position attribute (such as beginning/end of a sentence)
  Identity of noun (such as selective parataxis, compound parataxis)
  Identity of conjugated independent word and auxiliary word
  Form of end of clause
  Meaning category
Identity information for English pattern
  Part of speech
  Singular or plural
  Position attribute (such as beginning/end of a sentence)
  Separation with punctuation marks and enclosure with quotation marks
  Capitalization
  Requiring negative representation
  Use of articles (the, a, an, or without article)
  Intransitive/transitive verb
  Verb accompanied by direct or indirect object
  Meaning category Identity information required for translating Japanese is different from that for English. Therefore, as apparent from the above-given example, identity information of patterns of each language is different. If a part of speech of a given Japanese pattern is a noun, that Japanese pattern does not require information on conjugation. Thus, the same Japanese pattern may have different specific identity information.

In FIG. 2, the notation ":1" following the variables $N and $NP and patterns "tokkyo" and "patent" is an index 19C. The index is used to provide identity information to a variable itself when a pattern is represented with that variable. For example, the variable $N, which represents the source language pattern "tokkyo", shares identity information with the pattern "tokkyo" to which the same index as that of the variable is added.

Similarly, the same identity information as that of the pattern "patent" to which the same index 19C ":1" is added, is given to the variable $NP which represents the target language pattern "patent".

When the pattern "tokkyo" appears as a part of a longer character string, the pattern "tokkyo" and its target language pattern are referenced by source and target language patterns in other translation patterns as variables $N and $NP, respectively. In this case, the same index is added to the variables $N and $NP in order to indicate that they constitute a pair.

Thus, by adding an index to a variable which represents a given pattern, the identity of the variable can be referenced through the use of the index when the variable appears in another translation pattern. For example, in a translation pattern in which the variable "$N:1" is nested, like the source language pattern <$N:1 wo shinsei-suru:2>, the variable $N:1 and the variable $NP:1 would have the same index 19C, "1". Therefore, the variables can be replaced with the pair of "tokkyo" and "patent". The variable $N:1 inherits the identity information of the pattern "tokkyo" and the variable $NP:1 inherits the identity information of the pattern "patent". If an appropriate condition relating to the identity information of a variable is provided in this translation pattern, only a variable which satisfies the condition can be nested in that pattern.

In the above-mentioned example, variables can be nested in the nest structure, providing that there is a match to both of the variables $N:1 and $NP:1 by taking account of indices. Alternatively, a match to only one variable $N:1 in a source language may be provided as a condition. In this case, a translation can be generated not as accurately as in the previous example because the condition is not as strict, although the processing speed will increase. Which condition should be selected is a matter of trade-off between accuracy and processing speed of translation.

The constant, variable, identity, and index may be any representations which are distinguishable from each other. Here, a variable begins with "$" and an index is represented by a variable or constant followed by ":" and then a number.

In the translation pattern in which the source language pattern is <$N:1 wo shinsei-suru:2> as shown in FIG. 2, the source language pattern is represented with the variable $S and the target language pattern is represented with the variable $VP. The index "2" provides identity information of the character string "shinsei-suru" to the variable "$S" and the identity information of the character string "file" to the variable "$VP". Here, "+OBJ" indicates that the variable "$S" further has identity information 19B indicating that the variable has an object. "+PP" indicates that the variable "$VP" has identity information indicating that the variable has a prepositional phrase.

The representation <file:2:+V?+INF?> indicates the constraint 19D that the representation "file" should correspond to the representation "shinsei-suru" and satisfy the identity that it is an infinitive (+INF) and a verb (+V). The identity information can be set by referencing a dictionary to associate a word with information such as a noun, singular, or conjugated form which is relevant to the word. Thus, the constraint can range from a simple constraint indicating whether a particular identity item is contained to a complex constraint description in which a number of identity conditions are combined. However, it should be noted that the large amount of calculation time required for evaluating the satisfaction of a complex constraint condition would increase the time required for translation.

A source language pattern 18A may be represented in any form, including but not limited to, a sentence, clause, phrase, or a particular part of speech or a word. As described later, a source language pattern may contain a sentence, clause, or phrase in a nest structure 19A in which a variable 18B is nested, as in <$N:1 wa $N:2 dearu>. Similarly, a variable 18C which corresponds to a variable in said source language pattern and has the same index as that of the variable representing the source language pattern may be nested in a target language pattern.

In this way, even if the identity of the source language pattern differs from that of the target language pattern, such a translation pattern can be represented as a single pattern by representing the translation pattern with a pair of variables. Thus, the number of translation patterns generated can be reduced because the range of representations covered by one translation pattern is widened.

Nesting a translation pattern in another translation pattern through the use of a structure including such a pair of variables provides the following effects. The nested structure 19A using the variables 18B and 18C is very simple and flexible, so that a user, without expertise in linguistics or information systems, can easily use the system. The user can register or add a new translation pattern to the translation pattern file 13, without a loss of consistency with the translation system.

Such a translation pattern can be easily registered under a number of conversion rules in a simple manner similar to creating, for example, a wordbook by a junior high school student. Registering a translation pattern for an English-to-Japanese translation, for example, may follow the following rules.

(1) A translation pattern is represented by the form "source language pattern= target language pattern".

(2) A verb phrase in English is represented by beginning the phrase with "to" in the source language pattern, and the counterpart in the target language pattern is represented by ending the phrase with a word with declined or conjugated endings (a verb, adjective, or adverb) or "noun+ da". Variables representing the entire source language pattern and the entire target language pattern are represented by the variables "$VPE" and "$S", respectively. They share information with a verb immediately succeeding "to" in English and the last word with declined or conjugated endings in Japanese through an index. In this representation, the preposition "to" is removed.

(3) An adjectival phrase in English begins with "be" in the source language pattern, and the counterpart in the target language pattern ends with a word with declined or conjugated endings (a verb, adjective, or an adverb) or "noun + da". Variables representing the entire source language pattern and the entire target language pattern are represented by "$ADJP" and "$AP", respectively, and share information with a verb immediately succeeding "be" in English and the last word with declined or conjugated endings in Japanese through an index. In this representation, the verb "be" is removed.

(4) All other translation patterns are represented by a noun phrase. Variables representing the entire source language pattern and the entire target language pattern are represented by the variables "$NP" and "$N", respectively, and share information with the last word through an index.

(5) Variables are represented by "~" and have an index of 1, 2, 3, . . . in the order in which the variables appears. All variables indicate a noun phrase.

By using the descriptions "patent = tokkyo", "to file ~=~ wo shinsei-suru", and "be subject to conditions = joken ni yoru", the translation patterns <patent:1, $NP:1, $N:1, tokkyo:1>, <file:1 $NP:2, $VP:1, $S:1, $NP:2 wo shinsei-suru:1>, and <subject:1 to conditions, $ADJP:1, $AP:1, joken ni yoru:1> can be defined, respectively. These descriptions may be interactively entered by a user on a one-description basis, or may be entered as a batch of descriptions in a translation pattern input file 18 in text file format.

In a language like English in which information about gender and number of a noun and verb is important, it is difficult to describe information required for accurate translation by using translation patterns of the prior art. In contrast, the present invention can cover a wide range of representations by using indices and identity information, without the use of special language processing for generating a partial translation or machine translation processing based on accurate grammar. Furthermore, according to the present invention, information equivalent to grammar in the prior art can be represented by translation patterns in most cases. In the translation pattern <$NP:1:+3SG? is OK, $S, $S, $N:1 wa OK desu>, for example, even the agreement between the subject and the verb in a sentence, which is important in English, is treated properly by providing the constraint that the pattern is applicable only if the variable "$NP" has the identity of the third person singular and the present tense (+3SG).

Figure 3:
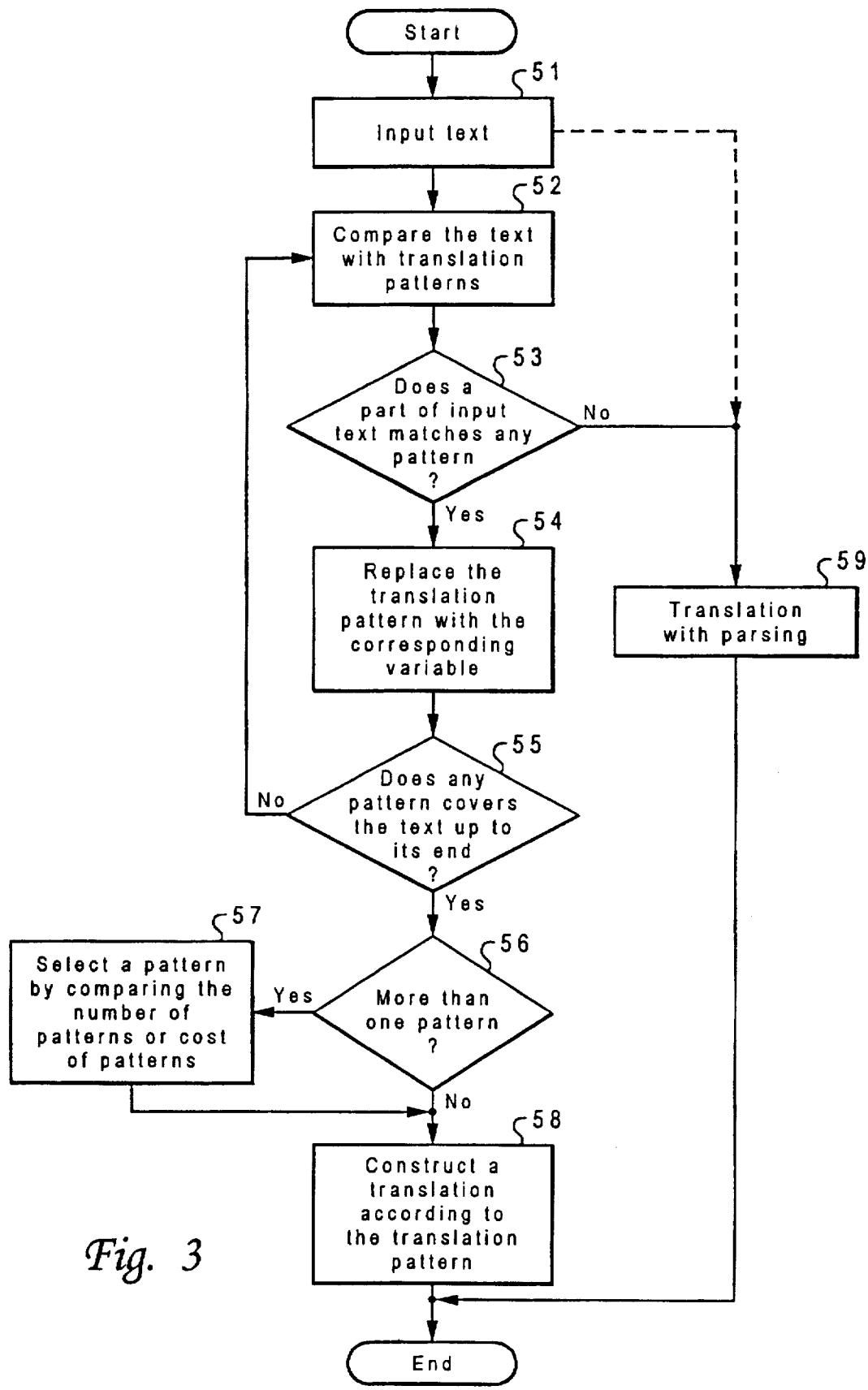
FIG. 3 illustrates an example of an algorithm for translation according to the present invention.

FIG. 3 shows an example algorithm for translation processing according to the present invention. First, a Japanese text is input (Step 51). The text is then compared with source language patterns in a translation pattern file (Step 52). If a part of the input text matches a source language pattern, the source language pattern is converted into the corresponding variable of the translation pattern (Steps 53 and 54). This process is repeated until a translation pattern which covers the text up to its end is extracted (Step 55). That is, the algorithm checks to see if there is a translation pattern which can reach the end of the pattern with the number of steps equal to the size of the text. If more than one translation pattern is extracted, a translation pattern which provides the least number of patterns, that is, the most number of nests, is selected. Alternatively, the user may previously give a cost to each pattern.

Finally, an English text is constructed by converting the extracted source language patterns into the target language patterns according to the translation pattern (Step 58). If no source language pattern matches the part of the text in Step 53, a machine translation process based on conventional parsing is performed (Step 59).

A translation can be immediately generated if the target language pattern is constructed at the same time the nests of the source language pattern is constructed. Alternatively, the matching with the input text may be performed by using only source language patterns and the corresponding target language patterns are extracted sequentially from the extracted source language patterns to generate an English text. The latter method can be applied to a method in which a source language pattern is extracted from source language pattern candidates selected by using a known context-free language parsing algorithm, and then a target language pattern is extracted, without taking account of constraints provided in the source language patterns. This last method will be described below.

Figure 5:
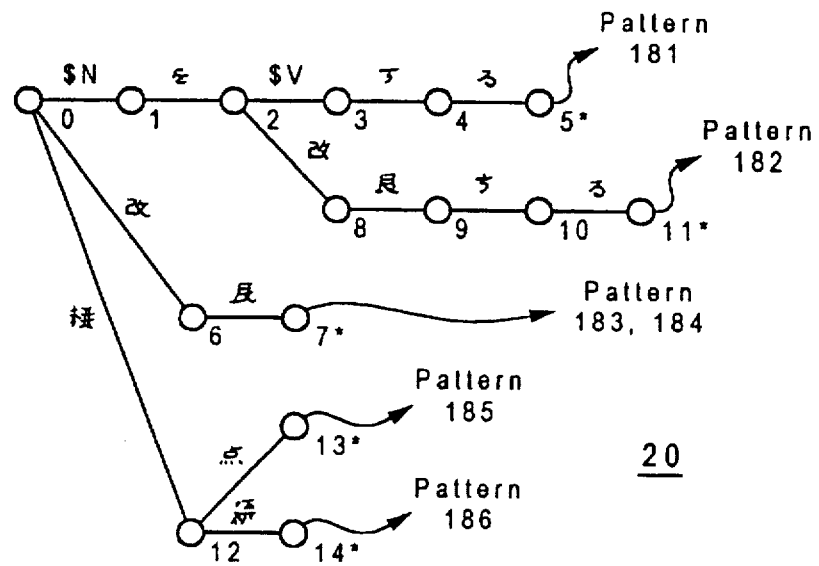
FIG. 5 illustrates a tree structure corresponding to a translation pattern.

The comparison between the text and the translation pattern in Step 52 is performed by checking the input text from left to right on a character basis. The algorithm for this process will be described in detail by using a text "Setten wo kairyo-suru" as an example with reference to FIG. 4 through FIG. 6. FIG. 4 shows translation patterns relating to this text among other translation patterns. FIG. 5 shows a tree structure 20 called the "index tree" which indicates the internal representation of the translation patterns. In this index tree, the state of each character and variable immediately after it is read into the system and corresponds to each node (0 to 16). Immediately right of each character and variable, excluding constraints and indices, is a node equivalent to the end of each source language pattern which contains a pointer to the corresponding source language pattern. Although a variable is not necessarily represented by a single character, each variable is represented as a unique character which differs from any other character in the index tree.

Figure 6:
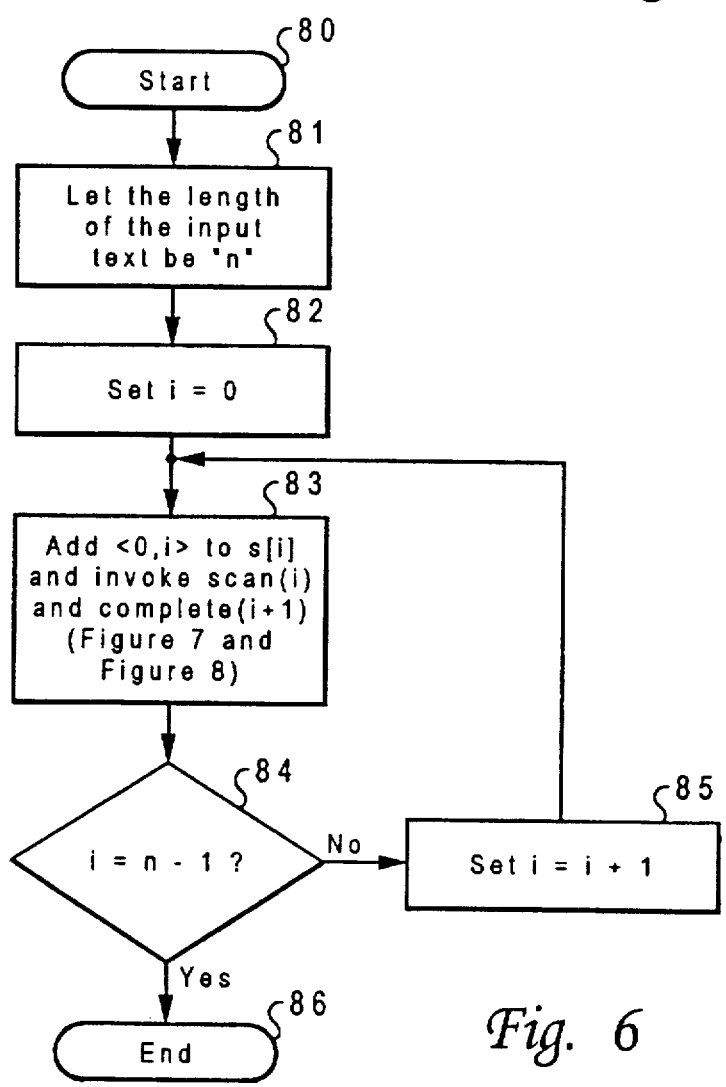
FIG. 6 illustrates an algorithm for matching between a text and a translation pattern.

In FIG. 6, first let the length of the input text be "n" (Step 81). The length of the text in this example is: n = 7. Then, a state set "s[i]" is associated with each character position "i". Because no pattern matching has started in the initial state at the beginning of the text parsing, s[0] = {<0,0>}. The parsing is performed by executing two operations, "scan (i)" and "complete (i)", at each character position i = 0,1, . . . , n (Steps 83 to 85). A component of a state set is a diagram <p, f>, which represents the state to which a given pattern reaches in the matching process. The "p" indicates a node in the index tree and the "f" indicates a position in a text at which the pattern matching has started.

For an input character x, the node "p'" up to which the index tree is traced from a given node "p" is defined as p' = shift (p,x) . For example, shift (7, su) = 15 in FIG. 7. The operation "shift (p,x) which follows the index tree can be performed faster by indexing or hashing the arc extending from each node in the index tree using an input alphabet size array.

Figures 7, 10:
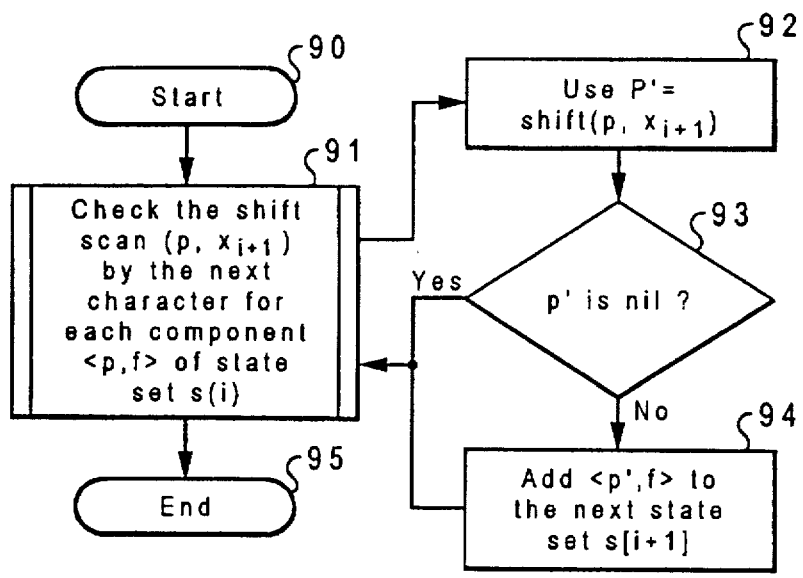
FIG. 7 illustrates a scan (i) process in detail.
FIG. 10 illustrates an example of a translation table used for constructing computer commands from natural-language-like inputs according to the present invention.

FIG. 7 shows the scan (i) process in detail. The scan (i) process checks to see if, for each state <p,f> of the state set "s[i]", the i+1th character "$x_{i+1}$" in the input text matches a pattern by using "shift (p,$x_{i+1}$) (Steps 91 and 92). If it matches the pattern, <shift (p,$x_{i+1}$), f> is added to the state set "s[i+1]" of the character position "i+1" (Steps 93 and 94).

Figure 8:
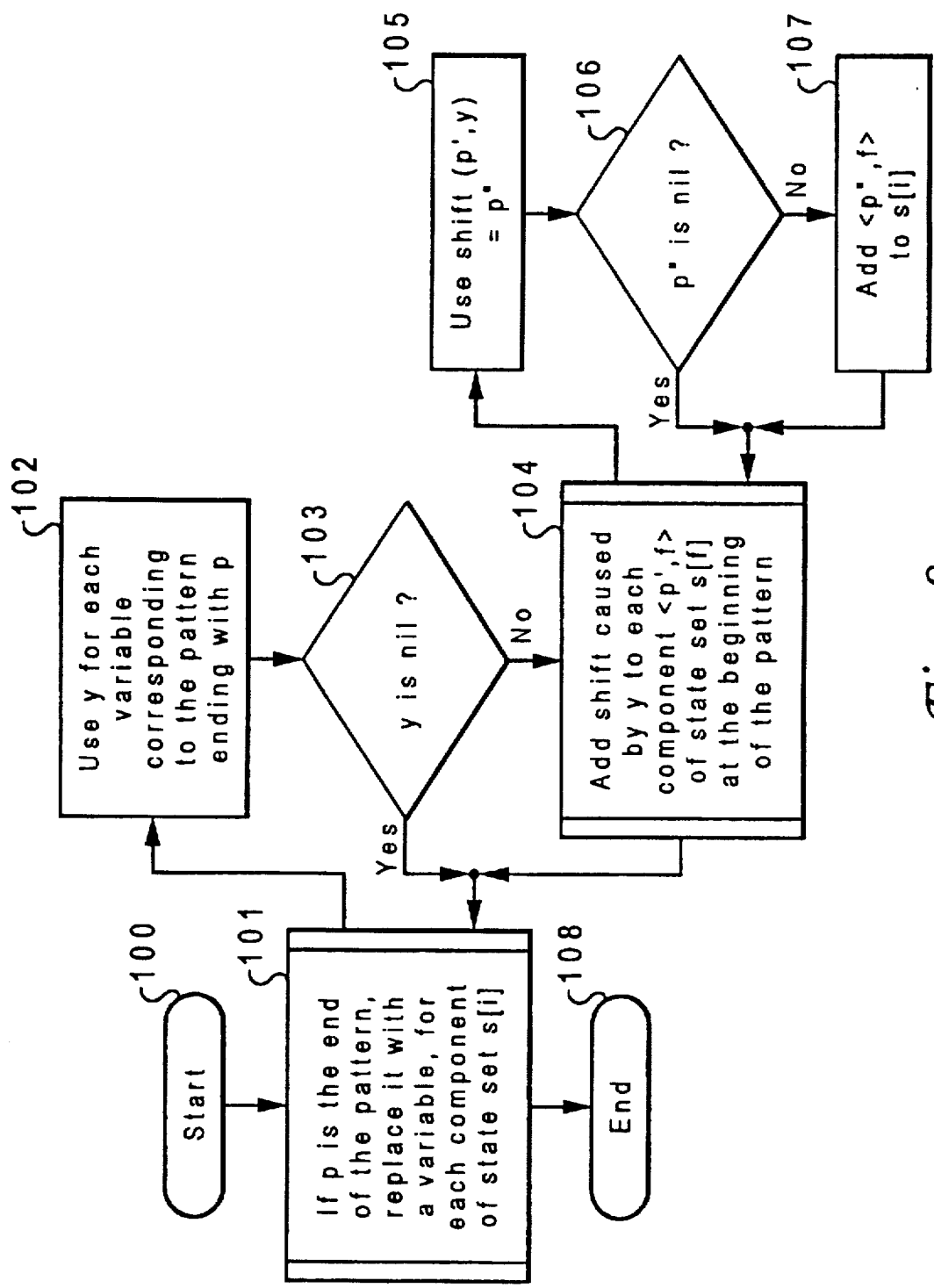
FIG. 8 illustrates a complete (i) process in detail.

FIG. 8 shows the complete (i) process in detail. For each state <p,f> of s[i], the complete (i) process uses "y" as the variable representing the pattern if "p" corresponds to the end of the pattern (Steps 101 and 102). Then, the process returns to the starting position "f" of the pattern to try the pattern matching by using "y". That is, the process tries shift (p',y) for each component <p',f> of the set s[i] to see if matching succeeds. If the matching succeeds, <shift (p', y), f> is added to s[i] (Steps 104 and 105).

Figure 9:
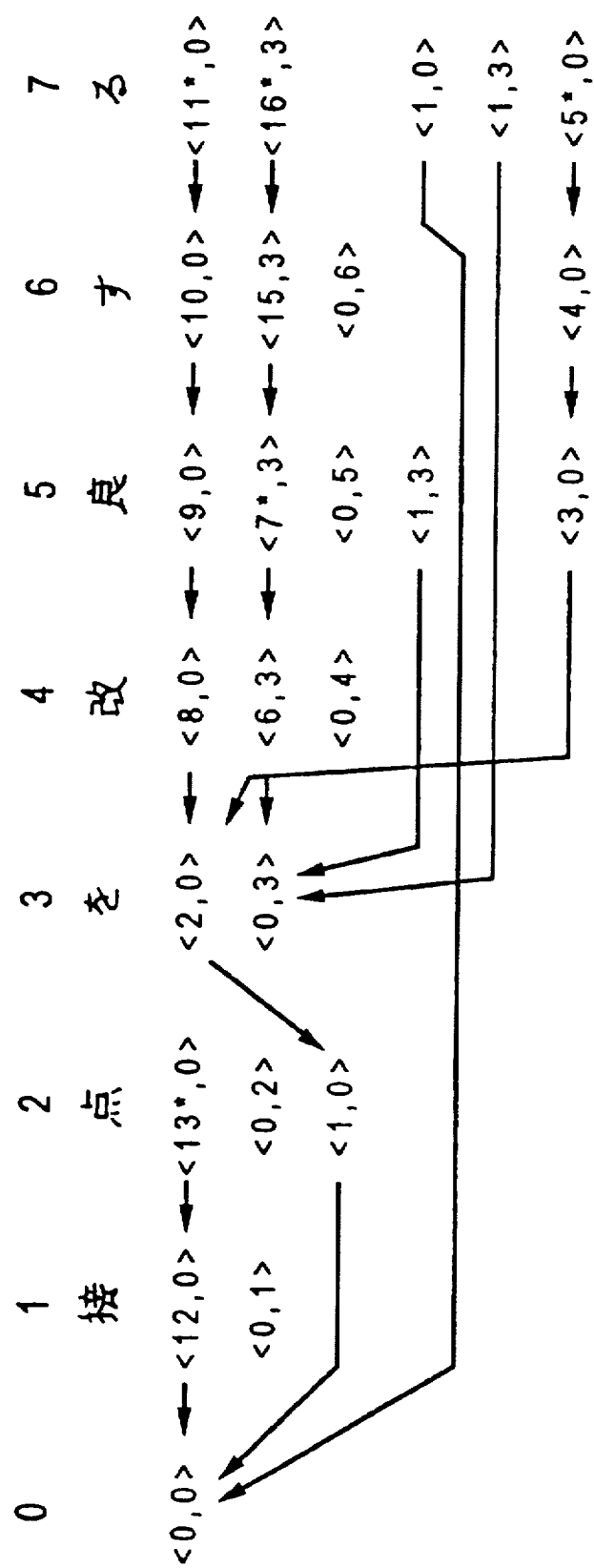
FIG. 9 illustrates the results of an algorithm executed on a translation pattern.

FIG. 9 shows the result of the algorithm executed on the text "setten wo kairyo-suru". In this figure, the set s|i| for each character position "i" is shown. In the character position i = 1, the partial pattern <12,0> which begins at node 0 and ends at node 12, that is, "setsu" was extracted. In the character position i = 2, the partial pattern <13,0> which begins at node 0 and ends at node 13, that is "settten" was extracted. Because node 13 has "*" corresponding to the end of the pattern, the partial pattern <1,0> in which "setten" is represented with the variable "$NP" was added to s[2] in the next character position i = 3. Thus, the partial pattern <2,0> which begins at node 0 and ends at node 2, that is "setten wo", was extracted. In this way, the pattern matching was repeated to the last character position.

Whether pattern matching has succeeded or not is determined based on whether a pattern which begins at the beginning of the text and ends at the last character position "n" (in this example, n = 7) was found. In this example, such patterns are <11*,0> and <5*,0>. Also in this figure, the state from which a shift () operation generated each state is indicated by an arrow. For example, the pattern <11*, 0> followed the path: node 0-12-13-0-1-2-8-9-10-11. It can be seen that the pattern <5*, 0> followed the path: node 0-12-13-0-1-2-3-4-5. By retaining this information in the algorithm, which pattern matched which part in the text can be determined by following the arrows after parsing.

In this example, it can be seen that the following two matches are possible:

(setten) wo kairyo-suru (setten) wo (kairyo) suru

Here, the parentheses indicate that the enclosed part matched the partial pattern.

After source language patterns which match the input text, except for source language pattern constraints and information sharing through the use of an index, are extracted in this way, patterns which properly contain such constraints and a pair of variables of the target language are identified based on the results of the matching.

In the above-mentioned example, the translation pattern 182 used for the matching (setten) wo kairyo-suru has the variable $NP to which the constraint that it means a device (+DEVICE?), and an index indicating that a variable corresponding to the variable $NP is the variable $N, are applied. The translation pattern 185 which matches the part "(setten)" is the correct solution because it satisfies the constraint and provides the pair of variables required.

On the other hand, the translation pattern 181 used for the matching, (setten) wo (kairyo) suru, contains no translation constraint description, but contains conditions for the pairs of variables $NP and $N, and $VP and $VP. These conditions are satisfied by translation patterns 185 and 184, respectively, which correspond to the partial translations. Thus, it is found that both of the matching results are proper translation candidates which satisfy the translation pattern constraints and the condition of the pair of variables.

Thus, usually there can be more than one matching pattern. Various techniques may be used to select one of the matching translation patterns. The simplest technique is one in which the number of patterns is used as the highest priority in consideration of choosing a pattern with the highest degree of matching. In the above-mentioned example, it is apparent from FIG. 5 that "(setten) wo (kairyo) suru" uses three patterns (181, 183, and 185), whereas "(setten) wo kairyo suru" uses two patterns (182 and 185). Therefore, the latter "(setten) wo kairyo suru" should be selected. One very effective alternative technique is to give a cost to each translation pattern. In this technique, a lower cost is given to, for example, the translation pattern 182 because it is a more definitive translation pattern, and a higher cost is given to the translation pattern 181 because it is considered to be a more general one, and an even cost is given to other patterns which provide words used for the translation, so that a translation pattern with a lower total cost among the matched patterns, which is a more definitive translation, takes precedence.

It is easy to generate a translation from the resultant matching. It is accomplished simply by representing each of the individual source language patterns in FIG. 5 with a target language pattern according to the translation patterns (182, 185). In this way, a translation "Improve point of contact in productivity." is yielded. The pattern matching algorithm of the present invention effectively works for a large number of patterns without impairing the response of the entire system. However, it can take a significant amount of time to translate an input text having a large number of translation candidates or constraints. Therefore, techniques for speeding up the system are essential, such as permitting only those constraints which can easily be evaluated as mentioned above to be used, or maintaining only the top N translation pattern candidates with high precedence as the patterns providing partial translations, in order to achieve a more efficient translation system as a whole.

The method and system of pattern-based translation described herein works efficiently, by configuring the system so as to use, as a preprocess for a conventional translation system, the pattern-based translation when the pattern matching has succeeded, and to activate the machine translation system when the pattern matching has failed. This means that the translation patterns of the present invention are provided for those fields for which a conventional machine translation system is hard to customize and those patterns are used in a preprocess for machine translation. Thus, special representations which cannot be translated by the machine translation system can be translated faster. Of course, because the translation patterns described herein are provided with the description ability which favorably compares with the grammar description ability used in conventional translation systems, translation patterns used for translating all input texts may be constructed. In this case, the translation patterns registered by the user are directly incorporated with the grammar written with the translation patterns and a much wider range of representations can be translated compared with a simple dictionary, so that a learning ability which cannot be achieved by conventional translation systems is provided.

The pattern-based translation method described herein, of course, can also be used in a translation system for translating between any two or more natural languages. Furthermore, it can be used for a system other than systems for natural language-to-natural language translation. As an example, FIG. 10 shows a translation table used for constructing computer commands from natural-language-like inputs. The symbol "@" indicates an alphabet name up to eight digits which represents a file name. For example, a file name such as "WEIGHT.TXT" can be described. In addition, a command such as "COPYFILE WEIGHT.TXT TO HEALTH.TXT" can be constructed by combining the file name with a pattern having a nested structure from natural-language-like inputs.

Advantages of the invention

According to the present invention, translation patterns which are provided by the user can be efficiently retrieved and a translation can be generated based on those patterns. The form of the translation pattern is very simple and flexible so that even a user without expertise in linguistics or computer systems can add a new pattern to the translation system, without impairing the consistency of the translation system. Furthermore, because the pattern matching algorithm which uses tree-structured indices efficiently works for a large number of patterns, the response of the entire system is not impaired.

While the invention has been particularly shown and described with reference to a preferred embodiment, it will be understood by those skilled in the art that various changes in form and detail may be made therein without departing from the spirit and scope of the invention.

What is claimed is:

1. A data processing system implemented method of translating a text written in a source language into a target language, said method comprising the steps of:

providing a plurality of translation patterns, wherein each of said plurality of translation patterns includes a source language pattern, a target language pattern corresponding to said source language pattern, a variable corresponding to said source language pattern, and a variable corresponding to said target language pattern;

determining if a portion of said text corresponds to a source language pattern within said plurality of translation patterns;

representing a first source language pattern with a first variable and a first target language pattern corresponding to said first source language pattern with a second variable in response to a determination that said portion of said text corresponds to a source language pattern within said plurality of translation patterns;

determining if said portion of said text represented by said first variable corresponds to a source language pattern within said plurality of translation patterns having a nested structure in which at least said first variable is embedded; and representing a second source language pattern with a third variable and a second target language pattern corresponding to said second source language pattern with a fourth variable in response to a determination that said portion of said text represented by said first variable corresponds to a source language pattern within said plurality of translation patterns having a nested structure in which at least said first variable is embedded.

2. A method as set forth in claim 1, wherein said step of representing a second source language pattern with a third variable and a second target language pattern corresponding to said second source language pattern with a fourth variable further comprises the steps of:

determining if a target language pattern having a nested structure in which said second variable is embedded corresponds to a source language pattern within said plurality of translation patterns; and representing a second source language pattern with a third variable and a second target language pattern corresponding to said second source language pattern with a fourth variable in response to a determination that a target language pattern having a nested structure in which said second variable is embedded corresponds to a source language pattern within said plurality of translation patterns.

3. A method as set forth in claim 1, wherein each said source language pattern and said target language pattern include identity information indicating a characteristic thereof said method further comprising the step of:

in response to each of said representing steps, providing identity information of a represented language pattern to a representing variable.

4. A method as set forth in claim 3, wherein each said representing variable includes an index, said index identifying a source language pattern and target language pattern pair, and wherein said step of providing identity information further comprises the step of:

in response to each of said representing steps, selectively providing identity information of a represented language pattern to a representing variable utilizing said index.

5. A method as set forth in claim 3, wherein said step of determining if said portion of said text represented by said first variable corresponds to a source language pattern within said plurality of translation patterns having a nested structure in which at least said first variable is embedded further comprises the step of:

determining if said portion of said text represented by said first variable corresponds to a source language pattern within said plurality of translation patterns having a nested structure in which at least said first variable is embedded, utilizing said identity information provided to said first variable.

6. A method as set forth in claim 1, wherein said step of providing a plurality of translation patterns further comprises the steps of:

specifying a source language pattern of said translation pattern;

specifying a target language pattern of said translation pattern corresponding to said source language pattern; and constructing said translation pattern utilizing said specified source language pattern and said specified target language pattern.

7. A method as set forth in claim 6, wherein said step of constructing said translation pattern further comprises the steps of:

associating a first variable, including an index, with said source language pattern;

associating a second variable, including an index, with said target language pattern; and storing said translation pattern within said data processing system for subsequent utilization by said system for translating.

8. A data processing system for translating a text written in a source language into a target language, comprising:

means for providing a plurality of translation patterns, wherein each of said plurality of translation patterns includes a source language pattern, a target language pattern corresponding to said source language pattern, a variable corresponding to said source language pattern, and a variable corresponding to said target language pattern;

means for determining if a portion of said text corresponds to a source language pattern within said plurality of translation patterns;

means for representing a first source language pattern with a first variable and a first target language pattern corresponding to said first source language pattern with a second variable in response to a determination that said portion of said text corresponds to a source language pattern within said plurality of translation patterns;

means for determining if said portion of said text represented by said first variable corresponds to a source language pattern within said plurality of translation patterns having a nested structure in which at least said first variable is embedded; and means for representing a second source language pattern with a third variable and a second target language pattern corresponding to said second source language pattern with a fourth variable in response to a determination that said portion of said text represented by said first variable corresponds to a source language pattern within said plurality of translation patterns having a nested structure in which at least said first variable is embedded.

9. A data processing system as set forth in claim 8, wherein said means for representing a second source language pattern with a third variable and a second target language pattern corresponding to said second source language pattern with a fourth variable further comprises:

means for determining if a target language pattern having a nested structure in which said second variable is embedded corresponds to a source language pattern within said plurality of translation patterns; and means for representing a second source language pattern with a third variable and a second target language pattern corresponding to said second source language pattern with a fourth variable in response to a determination that a target language pattern having a nested structure in which said second variable is embedded corresponds to a source language pattern within said plurality of translation patterns.

10. A data processing system as set forth in claim 8, wherein each said source language pattern and said target language pattern include identity information indicating a characteristic thereof, said data processing system further comprising:

means for providing identity information of a represented language pattern to a representing variable.

11. A data processing system as set forth in claim 10, wherein each said representing variable includes an index, said index identifying a source language pattern and target language pattern pair, and wherein said means for providing identity information further comprises:

means for selectively providing identity information of a represented language pattern to a representing variable utilizing said index.

12. A data processing system as set forth in claim 10, wherein said means for determining if said portion of said text represented by said first variable corresponds to a source language pattern within said plurality of translation patterns having a nested structure in which at least said first variable is embedded further comprises:

means for determining if said portion of said text represented by said first variable corresponds to a source language pattern within said plurality of translation patterns having a nested structure in which at least said first variable is embedded, utilizing said identity information provided to said first variable.

13. A data processing system as set forth in claim 8, wherein said means for providing a plurality of translation patterns further comprises:

means for specifying a source language pattern of said translation pattern;

means for specifying a target language pattern of said translation pattern corresponding to said source language pattern; and means for constructing said translation pattern utilizing said specified source language pattern and said specified target language pattern.

14. A data processing system as set forth in claim 13, wherein said means for constructing said translation pattern further comprises:

means for associating a first variable, including an index, with said source language pattern;

means for associating a second variable, including an index, with said target language pattern; and means for storing said translation pattern within said data processing system for subsequent utilization by said data processing system for translating.

15. A data processing system as set forth in claim 10, wherein identity information for a source language pattern differs from identity information for a target language pattern corresponding to said source language pattern.

16. A computer program product to be utilized within a data processing system for translating a text written in a source language into a target language, said computer program product comprising:

media usable by said data processing system for storing and executing instruction means;

instruction means, embodied within said media, for providing a plurality of translation patterns, wherein each of said plurality of translation patterns includes a source language pattern, a target language pattern corresponding to said source language pattern, a variable corresponding to said source language pattern, and a variable corresponding to said target language pattern;

instruction means, embodied within said media, for determining if a portion of said text corresponds to a source language pattern within said plurality of translation patterns;

instruction means, embodied within said media, for representing a first source language pattern with a first variable and a first target language pattern corresponding to said first source language pattern with a second variable in response to a determination that said portion of said text corresponds to a source language pattern within said plurality of translation patterns;

instruction means, embodied within said media, for determining if said portion of said text represented by said first variable corresponds to a source language pattern within said plurality of translation patterns having a nested structure in which at least said first variable is embedded; and instruction means, embodied within said media, for representing a second source language pattern with a third variable and a second target language pattern corresponding to said second source language pattern with a fourth variable in response to a determination that said portion of said text represented by said first variable corresponds to a source language pattern within said plurality of translation patterns having a nested structure in which at least said first variable is embedded.

17. A computer program product as set forth in claim 16, wherein said instruction means for representing a second source language pattern with a third variable and a second target language pattern corresponding to said second source language pattern with a fourth variable further comprises:

instruction means, embodied within said media, for determining if a target language pattern having a nested structure in which said second variable is embedded corresponds to a source language pattern within said plurality of translation patterns; and instruction means, embodied within said media, for representing a second source language pattern with a third variable and a second target language pattern corresponding to said second source language pattern with a fourth variable in response to a determination that a target language pattern having a nested structure in which said second variable is embedded corresponds to a source language pattern within said plurality of translation patterns.

18. A computer program product as set forth in claim 16, wherein said instruction means for providing a plurality of translation patterns further comprises:

instruction means, embodied within said media, for specifying a source language pattern of said translation pattern;

instruction means, embodied within said media, for specifying a target language pattern of said translation pattern corresponding to said source language pattern; and instruction means, embodied within said media, for constructing said translation pattern utilizing said specified source language pattern and said specified target language pattern.

19. A computer program product as set forth in claim 18, wherein said instruction means for constructing said translation pattern further comprises:

instruction means, embodied within said media, for associating a first variable, including an index, with said source language pattern;

instruction means, embodied within said media, for associating a second variable, including an index, with said target language pattern; and instruction means, embodied within said media, for storing said translation pattern within said data processing system for subsequent utilization by said computer program product.

* * * * *